(12) United States Patent
Coles

(10) Patent No.: US 11,914,227 B2
(45) Date of Patent: Feb. 27, 2024

(54) COLOR CHANGING GLASSES FRAME APPARATUS

(71) Applicant: Trisha Coles, Lakewood, WA (US)

(72) Inventor: Trisha Coles, Lakewood, WA (US)

( * ) Notice: Subject to any disclaimer, the term of this patent is extended or adjusted under 35 U.S.C. 154(b) by 782 days.

(21) Appl. No.: 16/862,103

(22) Filed: Apr. 29, 2020

(65) Prior Publication Data

US 2021/0341749 A1    Nov. 4, 2021

(51) Int. Cl.
*G02C 5/00* (2006.01)
*G02F 1/13* (2006.01)

(52) U.S. Cl.
CPC ............ *G02C 5/008* (2013.01); *G02F 1/132* (2013.01)

(58) Field of Classification Search
CPC ................................ G02F 1/132; G02C 5/008
See application file for complete search history.

(56) References Cited

U.S. PATENT DOCUMENTS

| | | | |
|---|---|---|---|
| 3,802,945 A | 4/1974 | James | |
| 4,642,250 A | 2/1987 | Spector | |
| 4,687,306 A | 8/1987 | Lipson | |
| 6,196,680 B1 | 3/2001 | Novak | |
| 7,503,650 B2 | 3/2009 | Furry | |
| D635,179 S | 3/2011 | Della Valle | |
| 9,974,441 B2 | 5/2018 | Lartey | |

FOREIGN PATENT DOCUMENTS

| CN | 208569208 U | * | 3/2019 |
|---|---|---|---|
| WO | WO198605001 | | 8/1986 |

* cited by examiner

*Primary Examiner* — Jessica M Merlin

(57) ABSTRACT

A color changing glasses frame apparatus for showing body temperature change and stylistic expression includes a glasses frame including a pair of rim portions and a bridge portion extending between the pair of rim portions. A pair of end pieces is coupled to a left distal end and a right distal end of the pair of rim portions of the glasses frame. A pair of temples is hingingly coupled to the pair of end pieces and moves between a folded position and an extended position. The glasses frame, the pair of end pieces, and the pair of temples each have an inner core and a coating layer continuously disposed around the inner core. The coating layer is heat sensitive and changes colors with the user's body temperature. A pair of lenses is coupled to the glasses frame within the pair of rim portions.

4 Claims, 4 Drawing Sheets

COLOR CHANGING GLASSES FRAME APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to glasses frame devices and more particularly pertains to a new glasses frame device for showing body temperature change and stylistic expression.

(2) Description of Related Art Including Information Disclosed Under 37 CFR 1.97 and 1.98

The prior art relates to glasses frame devices with color changing or other novelty features. Existing devices include glow-in-the-dark frames and frames with certain color changing elements, such as nose rests and ear pieces, but not with the entire glasses changing color.

BRIEF SUMMARY OF THE INVENTION

An embodiment of the disclosure meets the needs presented above by generally comprising a glasses frame including a pair of rim portions and a bridge portion extending between the pair of rim portions. A pair of end pieces is coupled to a left distal end and a right distal end of the pair of rim portions of the glasses frame. A pair of temples is coupled to the pair of end pieces. The pair of temples is hingingly coupled to the pair of end pieces and moves between a folded position and an extended position. The glasses frame, the pair of end pieces, and the pair of temples each have an inner core and a coating layer continuously disposed around the inner core. The coating layer is heat sensitive and changes colors with the user's body temperature. A pair of lenses is coupled to the glasses frame within the pair of rim portions.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
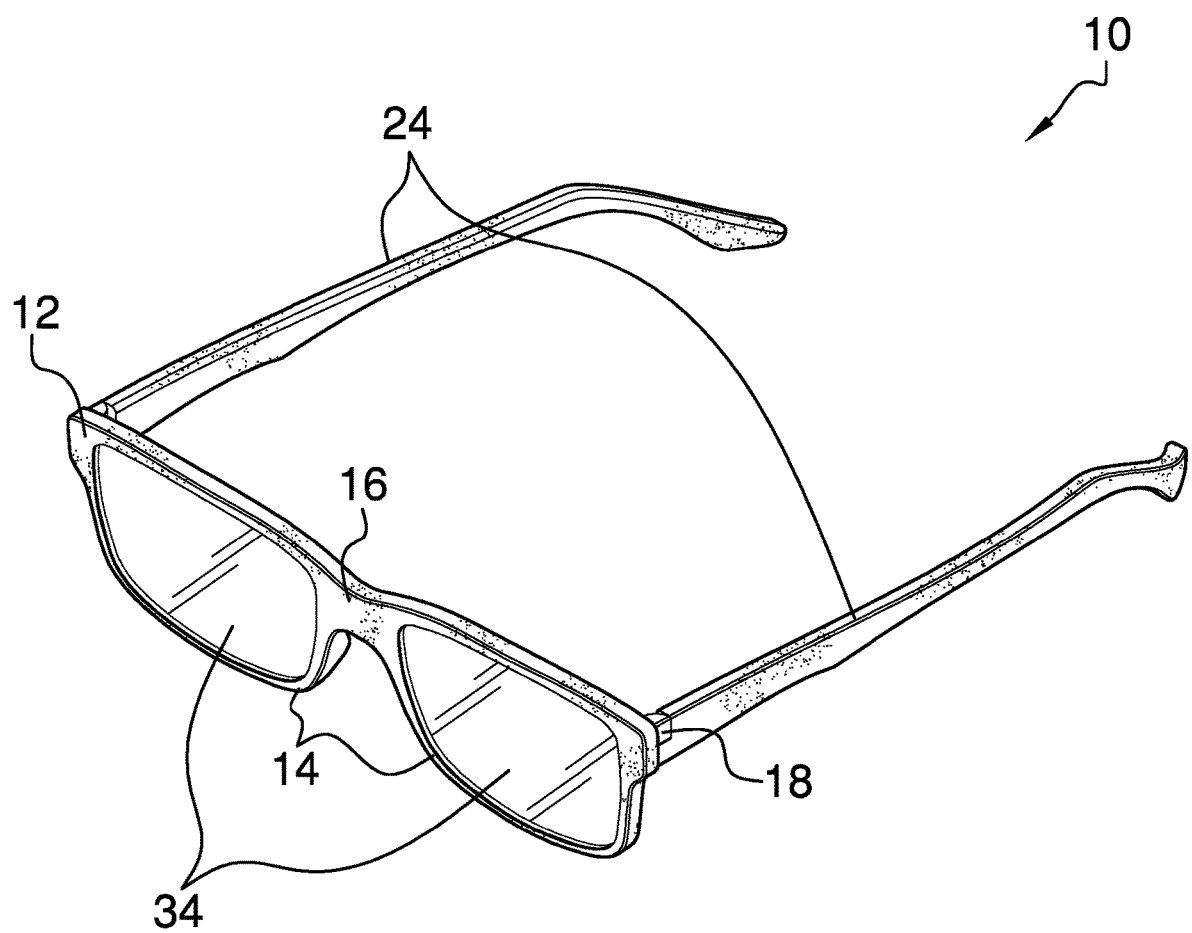
FIG. 1 is an isometric view of a color changing glasses frame apparatus according to an embodiment of the disclosure.
Figure 2:
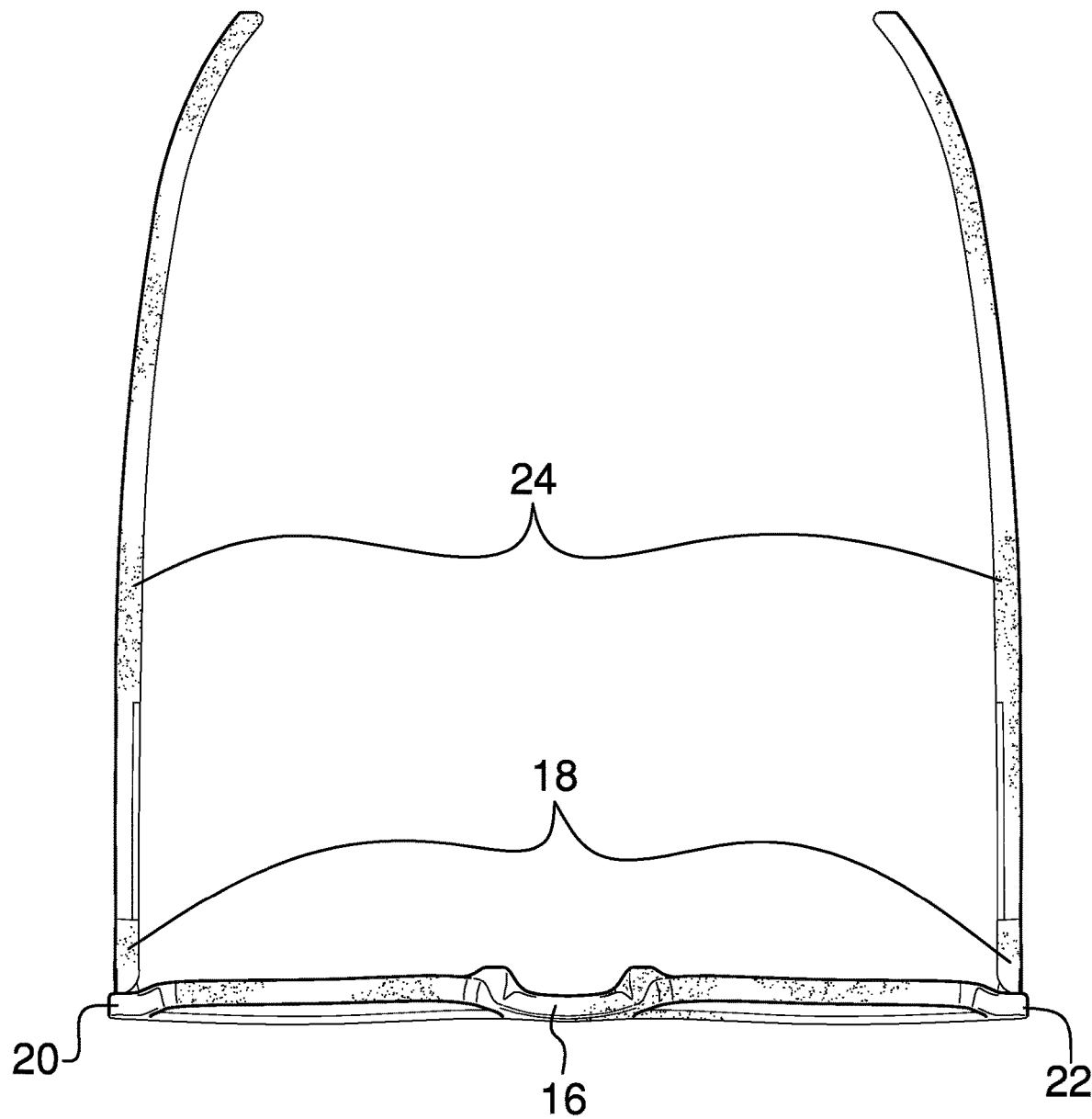
FIG. 2 is a bottom plan view of an embodiment of the disclosure.
Figure 3:
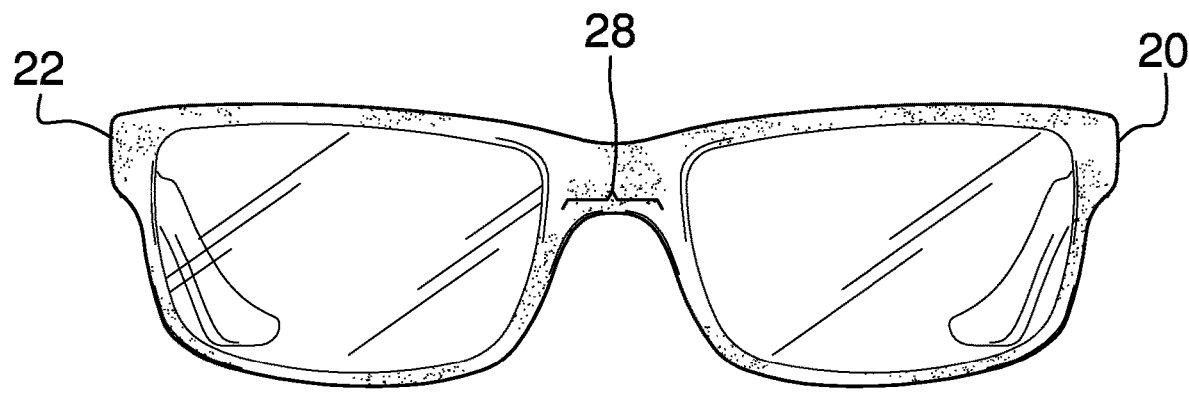
FIG. 3 is a front elevation view of an embodiment of the disclosure.
Figure 4:
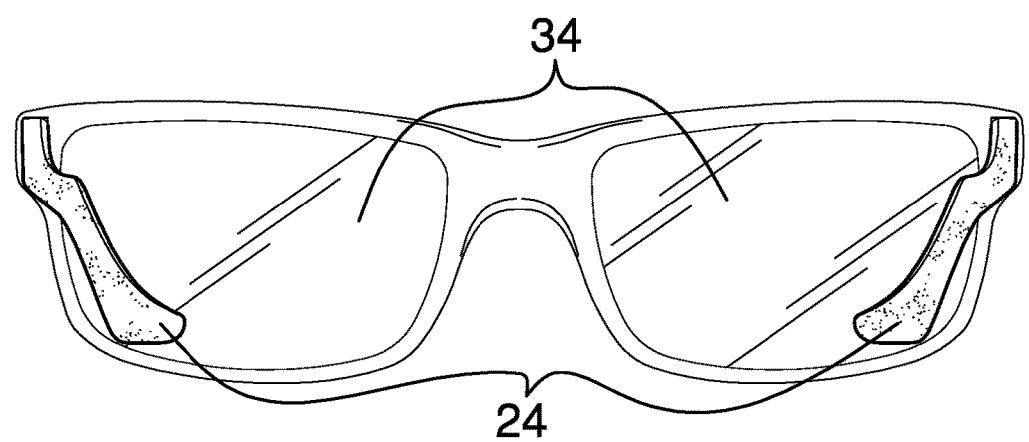
FIG. 4 is a rear elevation view of an embodiment of the disclosure.
Figure 5:
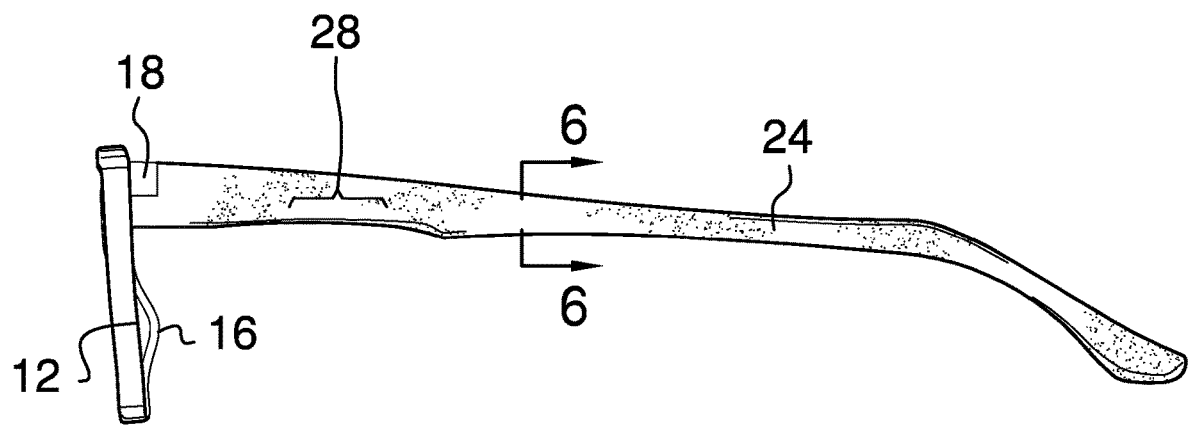
FIG. 5 is a side elevation view of an embodiment of the disclosure.
Figure 6:
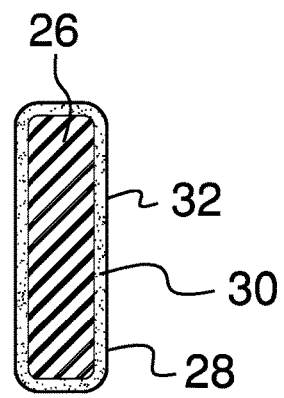
FIG. 6 is a cross-sectional view of an embodiment of the disclosure along the line 6-6 of FIG. 5.

With reference now to the drawings, and in particular to FIGS. 1 through 6 thereof, a new glasses frame device embodying the principles and concepts of an embodiment of the disclosure and generally designated by the reference numeral 10 will be described.

As best illustrated in FIGS. 1 through 6, the color changing glasses frame apparatus 10 generally comprises a glasses frame 12 including a pair of rim portions 14 and a bridge portion 16 extending between the pair of rim portions 14. The bridge portion 16 may include a pair of pad arms and a pair of nose pads coupled to the pair of pad arms. A pair of end pieces 18 is coupled to the glasses frame 12. The pair of end pieces 18 is coupled to a left distal end 20 and a right distal end 22 of the pair of rim portions. A pair of temples 24 is coupled to the pair of end pieces 18. The pair of temples 24 is hingingly coupled to the pair of end pieces 18 and moves between a folded position and an extended position.

The glasses frame 12, the pair of end pieces 18, and the pair of temples 24 each have an inner core 26 and a coating layer 28 continuously disposed around the inner core 26. The coating layer 28 changes colors with the user's body temperature and may comprise a plurality of thermotropic liquid crystals 30 within an outer transparent membrane 32. The thermotropic liquid crystals 30 change structure at a molecular level to affect the wavelengths of light being absorbed and reflected and to thus alter the visual chromatic appearance to an observer.

The thermotropic liquid crystals 30 may be selected and manipulated to react to different temperature thresholds as well as to select which colors are shown. The coating layer 28 may change between three predetermined colors including a normal color for temperatures within a normal body temperature range, a cold color for temperatures below the normal body temperature range, and a hot color for temperatures above the normal body temperature range. The coating layer 28 may alternatively change between only two predetermined colors, the hot color and the cold color, transitioning at a predetermined threshold. The user thus has further ability to personalize his or her glasses.

A pair of lenses 34 is coupled to the glasses frame 12 within the pair of rim portions 14. The pair of lenses 34 may be, but is not limited to, reading glasses, prescriptions lenses, sunglasses, blue light blocking lenses, protective lenses, novelty lenses, and the like. The apparatus 10 may thus be applied to any application traditional glasses are used for.

In use, the apparatus 10 is worn like traditional glasses. As the user's body temperature fluctuates the heat is transferred through the bridge portion 16 and the pair of temples 24 to change the color of the coating layer 28.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A color changing glasses frame apparatus comprising:
   a glasses frame including a pair of rim portions and a bridge portion extending between the pair of rim portions;
   a pair of end pieces coupled to the glasses frame, the pair of end pieces being coupled to a left distal end and a right distal end of the pair of rim portions;
   a pair of temples coupled to the pair of end pieces, the pair of temples being hingingly coupled to the pair of end pieces and moving between a folded position and an extended position;
   wherein the glasses frame, the pair of end pieces, and the pair of temples each have an inner core and a coating layer continuously disposed around the inner core, the coating layer being heat sensitive and changing colors with the user's body temperature;
   a pair of lenses coupled to the glasses frame, the pair of lenses being coupled within the pair of rim portions; and
   the coating layer including a plurality of thermotropic liquid crystals within an outer transparent membrane.

2. The color changing glasses frame apparatus of claim 1 further comprising the coating layer changing between two predetermined colors including a cold color for temperatures below a predetermined temperature, and a hot color for temperatures above the predetermined temperature.

3. A color changing glasses frame apparatus comprising:
   a glasses frame including a pair of rim portions and a bridge portion extending between the pair of rim portions;
   a pair of end pieces coupled to the glasses frame, the pair of end pieces being coupled to a left distal end and a right distal end of the pair of rim portions;
   a pair of temples coupled to the pair of end pieces, the pair of temples being hingingly coupled to the pair of end pieces and moving between a folded position and an extended position;
   wherein the glasses frame, the pair of end pieces, and the pair of temples each have an inner core and a coating layer continuously disposed around the inner core, the coating layer including a plurality of thermotropic liquid. crystals within an outer transparent membrane, the thermotropic liquid crystals changing colors with the user's body temperature, the coating layer changing between three predetermined colors including a normal color for temperatures within a normal body temperature range, a cold color for temperatures below the normal body temperature range, and a hot color for temperatures above the normal body temperature range; and
   a pair of lenses coupled to the glasses frame, the pair of lenses being coupled within the pair of rim portions.

4. A color changing glasses frame apparatus comprising:
   a glasses frame including a pair of rim portions and a bridge portion extending between the pair of rim portions;
   a pair of end pieces coupled to the glasses frame, the pair of end pieces being coupled to a left distal end and a right distal end of the pair of rim portions;
   a pair of temples coupled to the pair of end pieces, the pair of temples being hingingly coupled to the pair of end pieces and moving between a folded position and an extended position;
   wherein the glasses frame, the pair of end pieces, and the pair of temples each have an inner core and a coating layer continuously disposed around the inner core, the coating layer including a plurality of thermotropic liquid crystals within an outer transparent membrane, the thermotropic liquid crystals changing colors with the user's body temperature, the coating layer changing between two predetermined colors including a cold color for temperatures below a predetermined temperature, and a hot color for temperatures above the predetermined temperature; and
   a pair of lenses coupled to the glasses frame, the pair of lenses being coupled within the pair of rim portions.

* * * * *